US010626050B2

(12) United States Patent
Muncy et al.

(10) Patent No.: US 10,626,050 B2
(45) Date of Patent: Apr. 21, 2020

(54) COLD APPLIED ASPHALT COATING COMPOSITION AND ASSOCIATED METHODS OF USE

(71) Applicant: InVia Pavement Technologies, LLC, Tulsa, OK (US)

(72) Inventors: Dennis Muncy, Broken Arrow, OK (US); Tyler Francis, Wichita, KS (US); Timothy M. O'Connell, Tulsa, OK (US)

(73) Assignee: INGEVITY SOUTH CAROLINA, LLC, North Charleston, SC (US)

(*) Notice: Subject to any disclaimer, the term of this patent is extended or adjusted under 35 U.S.C. 154(b) by 98 days.

(21) Appl. No.: 15/206,817

(22) Filed: Jul. 11, 2016

(65) Prior Publication Data

US 2017/0008803 A1 Jan. 12, 2017

Related U.S. Application Data

(60) Provisional application No. 62/191,389, filed on Jul. 11, 2015.

(51) Int. Cl.
*C04B 26/26* (2006.01)
*C08L 95/00* (2006.01)
*E01C 7/35* (2006.01)
*C04B 111/00* (2006.01)

(52) U.S. Cl.
CPC ............ *C04B 26/26* (2013.01); *C08L 95/005* (2013.01); *E01C 7/353* (2013.01); *C04B 2111/0075* (2013.01); *C04B 2111/00577* (2013.01); *C08L 2555/54* (2013.01); *C08L 2555/80* (2013.01)

(58) Field of Classification Search
None
See application file for complete search history.

(56) References Cited

U.S. PATENT DOCUMENTS

| | | | |
|---|---|---|---|
| 4,282,037 A | 8/1981 | Burris et al. | |
| 5,662,733 A * | 9/1997 | Hudson | C09J 195/00 106/278 |
| 6,362,257 B1 | 3/2002 | Chehovitis et al. | |
| 2006/0276559 A1* | 12/2006 | Hernandez | C08G 18/10 521/151 |
| 2010/0307380 A1* | 12/2010 | Fader | C08L 95/00 106/669 |
| 2011/0146539 A1* | 6/2011 | Poncelet | C08L 95/00 106/661 |
| 2014/0356526 A1 | 12/2014 | O'Connell et al. | |
| 2014/0373750 A1 | 12/2014 | O'Connell et al. | |

OTHER PUBLICATIONS

International Search Report and Written Opinion for PCT/US2016/041734, dated Sep. 26, 2016.

* cited by examiner

*Primary Examiner* — Nathan T Leong
(74) *Attorney, Agent, or Firm* — Bryan D. Zerhusen; Nicholas R. Herrel; Cantor Colburn LLP

(57) ABSTRACT

The present description relates to asphalt coating compositions, and methods of application, for coating asphalt paving surfaces. In particular, sprayable coating compositions are provided, and methods of application, for coating asphalt paving surfaces. In the coating composition, a lightweight aggregate material of sprayable particle size is stably suspended in a sprayable asphalt emulsion in an amount sufficient to increase the micro-texture surface roughness of the cured coating.

15 Claims, 1 Drawing Sheet

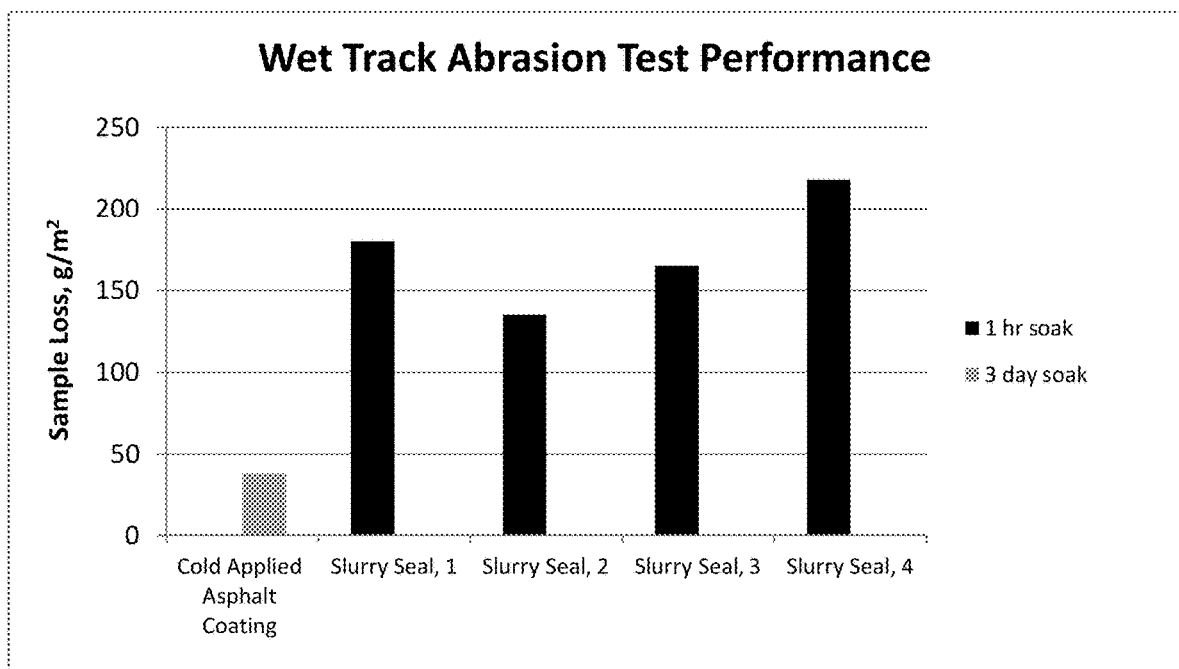

COLD APPLIED ASPHALT COATING COMPOSITION AND ASSOCIATED METHODS OF USE

CROSS-REFERENCE TO RELATED APPLICATIONS

The present application claims the benefit of priority under 35 U.S.C. 119(e) to U.S. Provisional Patent Application Ser. No. 62/191,389 filed Jul. 11, 2015, and titled: Cold Applied Asphalt Coating Composition and Associated Methods of Use, which is incorporated herein by reference in its entirety.

BACKGROUND

1. Field of the Discovery

The present disclosure relates to asphalt and aggregate compositions and methods of using the same for coating roads, parking lots, and other driving surfaces.

2. Background

It is well known that, for asphalt pavements, a preventative maintenance treatment (typically an asphalt coating composition referred to as a "sealer") will commonly be applied to the paving surface every 2-5 years or so. The coating material will typically be comprised of liquid asphalt or an anionic asphalt emulsion and will be applied, e.g., using a wand sprayer or a spraying machine. The coating desirably operates to (a) seal the surface from water intrusion, (b) improve the appearance of the pavement, (c) protect the underlying asphalt pavement from oxidation and UV damage, (d) protect the pavement from oil and gasoline spills, and (e) provide a surface which is easier to sweep, clean, shovel, and maintain. All of these benefits increase the service life of the pavement.

Unfortunately, after curing, the micro-texture of the asphalt coatings heretofore known in the art has been much smoother than the micro-texture of the underlying pavement surface so that the frictional resistance offered by the asphalt coating has been significantly less than that of the underlying pavement. This reduction in frictional resistance is not a concern in low speed environments. However, because of this significant loss in surface frictional resistance, asphalt maintenance coatings of this type have not been applied to asphalt road surfaces or to other asphalt paving surfaces upon which vehicles will be traveling at higher speeds.

Typical sealers are not formulated with a viscosity to suspend the aggregates chosen to enhance friction in other typical paving applications. The frictional aggregates used in other applications derive their frictional characteristics from both larger particles which cannot be sprayed, and from material properties chosen with a maximum value of hardness and density. Additionally, conventional slurry seal (SS) and micro-surfacing (MS) treatments require mixing at the time of application, which is associated with higher costs for application.

Consequently, a need exists for an improved asphalt and aggregate coating composition, including sprayable forms, which (a) will provide an increase in the degree of surface micro-texture roughness when cured, (b) preferably will not have a lower surface micro-texture roughness than the underlying pavement to which it is applied, (c) can be applied using conventional equipment, (d) will be highly durable, (e) will provide improved micro-texture over the life of the spray coating, (f) will provide all of the other benefits of a superior pavement coating, and (g) can be pre-mixed, stored, and transported for later use.

SUMMARY

Presently described are asphalt and aggregate coating compositions, methods of making and using the same, which address one or more of the shortcomings of the art. In particular, the description provides a central plant cold applied asphalt surface treatment. It was surprisingly and unexpectedly discovered that the cold applied asphalt compositions described herein are stable enough to pre-mix and be applied at higher amounts. Unlike conventional slurry seal (SS) and micro-surfacing (MS) treatments, which are mixed at the time of application, the asphalt compositions as described herein can be premixed and remain storage stable (i.e., are substantially homogeneous) for extended periods yet demonstrate traffic ready curing in times similar to SS. The described on-site, ready-mix cold applied composite asphalt formulations can also be applied in a thicker layer such that it provides a more durable surface coating.

Thus, in one aspect, the description provides a stable, pre-blended cold applied asphalt binder composition comprising a bitumen emulsion, inert filler, polymer, and optionally an additive, e.g., a rheology modifier, and/or a biocide.

In another aspect, the description provides a stable, pre-blended cold applied asphalt concrete composition comprising a bitumen emulsion, inert filler, polymer, aggregate, e.g., lightweight aggregate, and optionally an additive, e.g., a rheology modifier, and/or a biocide.

In any of the embodiments described herein, the stable, pre-blended cold applied asphalt binder composition has a viscosity of from about 2000 cp to about 8000 cp.

In another aspect, the description provides a method of making an asphalt concrete composition as described herein comprising the steps of: (a) admixing an asphalt binder composition as described herein; and (b) a lightweight aggregate.

Where desired, additional additives traditionally employed in the production of asphalt, polymer modified asphalt or bitumen emulsions may be incorporated into the aqueous phase of the bitumen emulsion in order to adjust the characteristics of the finished mix.

In another aspect, the disclosure provides methods of using the compositions as described herein to coat or seal a surface, e.g., parking, driving, walking or roofing surfaces. In certain embodiments, the method comprises the steps of, providing an asphalt concrete composition as described herein and applying the asphalt at a sufficient amount to coat or seal (partially or completely) a surface. In certain embodiments, the asphalt concrete compositions as described herein dry or cure in from about 1-10 hrs, preferably in about 3-6 hrs.

In certain embodiments, the method comprises the step of spraying the asphalt compositions as described herein.

The preceding general areas of utility are given by way of example only and are not intended to be limiting on the scope of the present disclosure and appended claims. Additional objects and advantages associated with the compositions, methods, and processes of the present invention will be appreciated by one of ordinary skill in the art in light of the instant claims, description, and examples. For example, the various aspects and embodiments of the invention may be utilized in numerous combinations, all of which are expressly contemplated by the present description. These additional advantages, objects and embodiments are expressly included within the scope of the present invention.

The publications and other materials used herein to illuminate the background of the invention, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the invention. The drawings are only for the purpose of illustrating an embodiment of the disclosure and are not to be construed as limiting the invention. Further objects, features and advantages of the invention will become apparent from the following detailed description taken in conjunction with the accompanying figures showing illustrative embodiments of the disclosure, in which:

FIG. 1 illustrates the wet track abrasion test performance of cold applied asphalt coating (CAAC) compared to examples of type 1 slurry seal. The CAAC resistance to water damage and sample loss after abrasion indicates improved performance compared to type 1 slurry seal.

DETAILED DESCRIPTION

The present disclosure provides cold applied asphalt compositions, and associated methods of making and using the same for sealing or coating all manner of asphalt roofing, parking, driving or walking pavement surfaces.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety. In particular, US 2014/0373750 A1, which relates to asphalt compositions and methods, is incorporated herein by reference in its entirety.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present invention. Unless otherwise defined, all technical and scientific terms used herein have the same meaning as commonly understood by one of ordinary skill in the art to which this invention belongs. The terminology used in the description is for describing particular embodiments only and is not intended to be limiting of the invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The term "compound", as used herein, unless otherwise indicated, refers to any specific chemical compound disclosed herein and includes tautomers, regioisomers, geometric isomers, and where applicable, stereoisomers, including optical isomers (enantiomers) and other steroisomers (diastereomers) thereof, as well as salts and derivatives thereof where applicable, in context. Within its use in context, the term compound generally refers to a single compound, but also may include other compounds such as stereoisomers, regioisomers and/or optical isomers (including racemic mixtures) as well as specific enantiomers or enantiomerically enriched mixtures of disclosed compounds. It is noted that in describing the present compounds, numerous substituents and variables associated with same, among others, are described. It is understood by those of ordinary skill that molecules which are described herein are stable compounds as generally described hereunder.

"Bitumen" can refer to a mixture of viscous organic liquids or semi-solids from crude oil that is black, sticky (i.e., a binder), soluble in carbon disulfide, and composed primarily of condensed aromatic hydrocarbons. Alternatively, bitumen refers to a mixture of maltenes and asphaltenes. Bitumen may be any conventional type of bitumen known to the skilled person. The bitumen may be naturally occurring. It may be crude bitumen, or it may be refined bitumen obtained as the bottom residue from vacuum distillation of crude oil, thermal cracking, hydrocracking or obtained from reclaimed asphalt pavement.

"Asphalt" is sometimes used interchangeably with bitumen to describe the binder. Generally, the term "asphalt concrete" is used to describe the binder plus the aggregate, which is generally used for paving or roofing applications. Asphalt is commonly qualified for paving applications. Examples of asphalt grades used in paving applications include stone mastic asphalt, soft asphalt, hot rolled asphalt, dense-graded asphalt, gap-graded asphalt, porous asphalt, mastic asphalt, and other asphalt types.

Presently described are asphalt coating compositions, and methods of making and using, which address one or more of the shortcomings of the art as discussed above. In particular, the description provides a stable, pre-blended, cold applied surface treatment. It was surprisingly and unexpectedly discovered that the cold applied compositions described herein stable enough to pre-mix and be applied at higher amounts. Unlike conventional slurry seal (SS) and microsurfacing (MS) treatments, which are mixed at the time of application, the asphalt compositions as described herein can be premixed and remain storage stable (i.e., substantially homogeneous) for extended periods yet demonstrate traffic ready curing in times similar to SS. Accordingly, the description provides on-site, ready-mix cold applied composite asphalt formulations that are surprisingly stable, and can be applied in a thicker layer such that it provides a more durable surface coating.

Thus, in one aspect, the description provides a stable, pre-blended, cold applied asphalt binder composition comprising as asphalt binder emulsion, water, inert filler, and polymer. In certain embodiments, the asphalt binder composition comprises an additive, e.g., a rheology modifier, a stabilizer, an emulsifier, a surfactant, carbon black, and/or a biocide.

Those of skill in the art will recognize that certain types of bitumen or asphalt, polymer modified asphalts, or blends thereof (unless context indicates otherwise, collectively, "asphalt") are particularly useful for asphalt or asphalt sealer applications, which are expressly contemplated herein. For example, in certain embodiments, the compositions comprise asphalt, such as, SHRP Performance Asphalt Grades PG 64-22, PG 58-28, asphalts of penetration grade 20-30, 40-50, 60-70, 85-100, 120-150 (but not limited to the listed), CSS-1h, CSS-1, SS-1, SS-1h and others, and emulsions prepared with the same.

In certain embodiments, the stable, pre-blended asphalt binder composition as described herein comprises from about 30% wt to about 75% wt of an asphalt emulsion. In certain additional embodiments, the composition as described herein comprises from about 30, 35, 40, 45, 50, 55, 60, 65, 70, or 75% wt of an asphalt emulsion. In certain additional embodiments, the composition as described herein comprises from about 50% wt to about 65% wt of an asphalt emulsion. In still additional embodiments, the composition as described herein comprises from about 55% wt to about 60% wt of an asphalt emulsion. In a preferred embodiment, the stable, pre-blended asphalt composition as described herein comprises about 51% wt of an asphalt emulsion.

In certain embodiments, the asphalt binder composition comprises an asphalt having a penetration when cured of between 20 and 500 dmm. Selection of the asphalt having a particular hardness is predicated upon a number of considerations, including, climatic use, and application. Penetration is determined according to, e.g., ASTM D 5.

Generally, in order to improve the workability of asphalt binder materials emulsifiers, stabilizers and/or surfactants can be added to the binder. It will be recognized by the skilled artisan that certain agents might be considered to be in one or more of the above categories depending on certain considerations such as, e.g., the type of agent, relative amount, application, and conditions of use.

In certain embodiments, the stable, pre-blended asphalt binder composition as described herein comprises an emulsifier. In certain embodiments, the emulsifier is present in an amount of from about 0.5% wt to about 5% wt based on the weight of the asphalt emulsion. In certain embodiments, the emulsifier is present in an amount of about 0.5, 1, 1.5, 2, 2.5, 3, 3.5, 4, 4.5, or 5% wt based on total weight of the asphalt emulsion. In certain embodiments, the emulsifier is present in an amount of about 3% wt based on the weight of the asphalt emulsion. In additional embodiments, the emulsifier is selected from the group consisting of anionic, cationic, and non-ionic. Examples of suitable emulsifiers suitable include, but are not limited to: amidoamine emulsifiers; imidazolines; non-ionic emulsifiers; quaternary ammonium emulsifiers; triamines; tetra-amines; penta-amines; amidated tall oil derivatives, e.g., fatty acids or rosins, and others known to one skilled in the art, as well as their derivatives.

Ionic emulsifiers which are suitable for use in the present disclosure include amphoteric emulsifiers, cationic emulsifiers, and combinations thereof.

As used herein the term "amphoteric emulsifiers" includes both mono-amphoteric and polyamphoteric emulsifiers. Amphoteric emulsifiers which are suitable for use in the present disclosure include, but are not limited to, the following: C-12 to C-24 (preferably C-16 to C-18) fatty acids, rosin acids, and combinations thereof modified with acrylic acid, maleic anhydride, fumaric acid, and/or other ene- and dieneophiles and further reacted with polyethylene polyamines, lithium C-12 to C-24 alkyl amidopropyl halide methyl carboxylate betaines, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, potassium C-12 to C-24 alkyl amidopropyl halide sulphate betaines. Unless the context indicates otherwise, the term "amphoteric emulsifiers" includes the above-noted compounds and their derivatives.

Useful anionic emulsifiers in the compositions described herein include, but are not limited to, petroleum sulfonates such as alpha-olefin sulfonates or sulfates, soap-type emulsifying agents, typically the alkali metal salts of higher (e.g., C6-C32) fatty acids, such as lauric, myristic, palimitic, oleic, ricinoleic and linoleic acids, or mixtures of acids available from animal or vegetable oils. Other examples of anionic emulsifiers are described in U.S. Pat. No. 4,282,037, the description of which is incorporated herein by reference. Additional anionic surfactants that may be included in the compositions described herein, include, e.g., water-soluble potassium salts of saturated or unsaturated higher (C6-C32) fatty acids, a sodium salt of a sulfuric acid ester of a higher alcohol, a sodium alkyl benzene sulfonate, a sodium salt of a dialkyl succinate sulfonic acid and a sodium salt of an alkyldiphenylether sulfonic acid. Of these, preferred are sodium alkyl benzene sulfonate, sodium lauryl sulfate, a polyoxethylene alkyl (or alkylphenyl)ether sulfonate and the like A preferred surfactant is an anionic emulsifier such as lignate-surfactant blend (Indulin SA-L, MWV, Charleston Heights, S.C.). Unless the context indicates otherwise, the term "anionic emulsifiers" includes the above-noted compounds and their derivatives.

Cationic emulsifiers which are suitable for use in the compositions described herein include, but are not limited to, the following: fatty imidazolines derived from C-12 to C-24 fatty acids, fatty imidoamines derived from C-12 to C-24 (preferably C-16 to C-18) fatty acids, rosin acids, and combinations thereof modified with maleic anhydride, fumaric acid, and/or other ene- and dieneophiles and further reacted with polyalkylenepolyamines; fatty amidoamines derived from C-12 to C-24 (preferably C-16 to C-18) fatty acids, rosin acids and combinations thereof modified with acrylic acid, maleic anhydride, fumaric acid, and/or other ene- and dieneophiles and further reacted with polyalkylenepolyamines; saturated C-12 to C-24 alkyl monoamines, unsaturated C-12 to C-24 alkyl monoamines, saturated C-12 to C-24 alkyl polypropylenepolyamines; unsaturated C-12 to C-24 alkyl polypropylenepolyamines; saturated C-12 to C-24 alkyl monoamines modified by reaction with ethylene oxide and/or propylene oxide to give polyoxyethylene derivatives; unsaturated C-12 to C-24 alkyl monoamines modified by reaction with ethylene oxide and/or propylene oxide to give polyoxyethylene derivatives; saturated C-12 to C-24 alkyl polypropylenepolyamines modified by reaction with ethylene oxide and/or propylene oxide to give polyoxyethylene derivatives; unsaturated C-12 to C-24 alkyl polypropylenepolyamines modified by reaction with ethylene oxide and/or propylene oxide to give polyoxyethylene derivatives; saturated C-12 to C-24 alkyl aryl monoamines, unsaturated C-12 to C-24 alkyl aryl monoamines; saturated C-12 to C-24 alkyl aryl polypropylenepolyamines, unsaturated C-12 to C-24 alkyl aryl polypropylenepolyamines; C-12 to C-24 quaternary amines; C-12 to C-24 alkyl ether amines; C-12 to C-24 alkylether polyamines; C-12 to C-24 alkyl polypropylene polyamine N-oxides; amine derivatives of tannins, amine derivatives of phenolic resins; amine derivatives of lignins, amine-modified polyacrylates; and combinations thereof. It is preferred that the cationic emulsifier be a member selected from the group consisting of saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, and combinations thereof. It is further preferred that the cationic emulsifier be a blend of at least one member selected from the group consisting of saturated and unsaturated C-12 to C-24 alkyl monoamines, C-12 to C-24 quaternary amines, saturated and unsaturated C-12 to C-24 alkyl polypropylenepolyamines, and combinations thereof. In certain embodiments, the emulsifier is an amine derivative of lignin.

Unless the context indicates otherwise, the term "cationic emulsifiers" includes the above-noted compounds and their derivatives.

In certain embodiments, the emulsifiers, not only convey the high-temperature shear-stability needed for mixing (and subsequent compacting) of the bituminous compositions, but also, impart a high viscosity to the bitumen emulsion (so that no thickener is needed for emulsion stability or for increased film coating on the aggregate) to enhance bitumen wetting of the aggregate surface, and to lower interfacial tension between the bitumen film and aggregate (so that a strong adhesive bond is maintained and water damage to the pavement is prevented).

Emulsifier formulations are further classified as rapid-setting (i.e., spray-grade), quick-setting, and slow-setting depending on the speed with which a given emulsion, using an economical dosage of emulsifier, will break upon contact with mineral aggregate. While rapid-setting, quick-setting, and slow-setting emulsifiers are suitable for use in the present disclosure, it is preferred to employ rapid-setting or quick-setting emulsifiers. It is further preferred to employ rapid-setting emulsifiers with dense-graded aggregate. This preference arises from the need to control such emulsion properties as the interfacial viscosity, Marangoni effect, and interfacial bitumen solubility at the elevated temperature of the present disclosure (i.e., about 50° C. to about 120° C.) and concurrently at low emulsifier dosages. Quick-setting and slow-setting emulsifiers require higher dosages and do not impart the target interfacial properties in the finished emulsion. Additionally, high emulsifier dosages are costly, contribute to low rates of compressive strength development, and increase moisture sensitivity in the finished pavement.

In any of the aspects or embodiments described herein, the composition can include a polymer. In any of the embodiments described herein, the polymer is a latex polymer or latex co-polymer, e.g., styrene-butadiene-rubber latex, polyisoprene latex, neoprene. In certain embodiments, the polymer is an acrylic latex polymer. In still additional embodiments, the polymer is a styrene-acrylic latex polymer. The liquid latex portion of the composition may preferably comprise, in one example, a liquid latex-based polymer modifier (such as BASF NS 175, NX 1129, NS 198, or NX 1138 (the BASF Butonal product line); Ultrapave anionic latex products UP-70, UP-7289, or UP-2897; or Ultrapave cationic latex products UP-65K, UP-1152, or UP-1158).

In certain embodiments, the stable, pre-blended asphalt binder composition as described herein comprises a polymer in an amount of from about 0.01% wt to about 20% wt based on the weight of the asphalt binder composition. In certain embodiments, the asphalt binder composition as described herein comprises a polymer in an amount of 0.01, 0.05, 0.1, 0.2, 0.3, 0.4, 0.5, 1, 2, 3, 4, 5, 6, 7, 8, 9, 10, 11, 12, 13, 14, 15, 16, 17, 18, 19, or 20% wt based on the weight of the asphalt binder composition. In certain embodiments, the polymer is present in an amount of about 2.8% wt based on the weight of the asphalt binder composition. In certain embodiments, the asphalt binder composition as described herein comprises a polymer in an amount of from about 1% wt to about 10% wt, or from about 2% wt to about 6% wt based on the total weight of the asphalt binder composition. In certain embodiments, the polymer is an acrylic polymer. In additional embodiments, the acrylic polymer is an acrylic latex. Polymers suitable for use in the asphalt compositions as described herein are readily available commercially from a variety sources.

In the composition, the liquid latex additive adheres to both the aggregate material and to the substrate surface (i.e., pavement or roofing surface), as well as fillers. The adhesive properties and elasticity of the liquid latex increase the strength, performance and durability of the asphalt composition. Examples of other suitable liquid latex additives include, but are not limited to: various block polymers such as SBS, EVA (ethylene-vinyl acetate), DuPont Evaloy, acrylics, and silicones.

For example, the polymer can be an acrylate, styrene-acrylic, ethylene-vinyl acetate (EVA), ethylene-acrylate, polyolefins, polybutene-1, amorphous polyolefin, polyamides, polyesters, polyurethanes, polyester-urethane, styrene block copolymers (SBC), polycaprolactone, polycarbonates, fluoropolymers, silicone rubbers, polypyrrole (PPY), styrene-butadiene-styrene (SBS), styrene-ethylene/butylene-styrene (SEBS), styrene-ethylene/propylene (SEP), styrene-isoprene-styrene (SIS), vinyl ethers, conjugated diene compound, vinyl-based aromatic hydrocarbon, hydrogenated conjugated diene-based polymer, non-hydrogenated conjugated diene-based polymer, butyl rubber, natural rubber, ethylene-propylene copolymers or styrene copolymers, singly or in mixture, wherein the copolymers concern statistical, alternating, graft or block copolymers, and combinations thereof.

More specifically, the latex emulsion polymers employed in the asphalt composition can include aqueous vinyl polymers, which are the reaction products of one or more ethylenically unsaturated monomers. Examples of the ethylenically unsaturated monomers include, but are not limited to, styrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, acrylic acid, methacrylic acid, itaconic acid, crotonic acid, a-methyl styrene, vinyl naphthalene, vinyl toluene, chloromethyl styrene, hydroxyethyl (meth)acrylate, hydroxypropyl (meth)acrylate, acrylonitrile, glycidyl methacrylate, acetoacetoxy ethyl methacrylate, acetoacetoxy ethyl acrylate, vinyl chloride, vinylidene chloride, vinyl acetate, butyl acrylamide, ethyl acrylamide, and the like.

Thus, water-based latexes may generally be prepared by polymerizing acrylic (ethylenically unsaturated) monomers. Before conducting polymerization, these ethylenically unsaturated monomers are either pre-emulsified in water/surfactant mixture or used as such. The polymerization process of making these acrylic latexes may also require an initiator (oxidant), a reducing agent, or a catalyst. Suitable initiators include conventional initiators such as ammonium persulfate, sodium persulfate, hydrogen peroxide, t-butyl hydroperoxide, ammonium or alkali sulfate, di-benzoyl peroxide, lauryl peroxide, di-tertiarybutylperoxide, 2,2-azobisisobutyronitrile, benzoyl peroxide, and the like. Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, AQUACATO, ferrous sulfate heptahydrate, ferrous chloride, cupric sulfate, cupric chloride, cobalt acetate, cobaltous sulfate, and mixtures thereof.

A conventional surfactant or a combination of surfactants is used as a stabilizer, such as an anionic or non-ionic emulsifier, in the suspension or emulsion polymerization preparation of a latex emulsion. Examples of preferred surfactants include, but are not limited to, alkali or ammonium alkylsulfate, alkylsulfonic acid, or fatty acid, oxyethylated alkyphenol, sulfosuccinates and derivatives, or any combination of anionic or non-ionic surfactants. A list of suitable surfactants is available in the treatise: McCutcheon's Emulsifiers 84 Detergents, North American Edition, MC Publishing Co., Glen Rock, N.J., 1997. Preferably, the surfactant will provide droplet/particle stability, but result in minimal aqueous phase nucleation (micellar or homogeneous).

The latex emulsion polymers useful according to the described compositions may have pendant moieties, meaning that the ethylenically unsaturated monomers used to prepare the latex polymers of the disclosure have been reacted into an addition polymer, and that a portion of the monomers remains as a pendant moiety. Alternatively, the polymers have residues from the ethylenically unsaturated monomers, in which the monomers have been reacted into an addition polymer via their ethylenic unsaturation, and that a portion of the monomers remains as a residue. Both these descriptions are well-known in the art of addition polymers, and the descriptions are not otherwise intended to be especially limiting.

As will be appreciated by those of skill in the art, the polymers listed above are not intended to be limiting on the scope of the invention.

In certain aspects, the polymer selected has a glass transition temperature suitable for the climate and application of the asphalt compositions described herein.

In any of the embodiments described herein, the stable, pre-blended asphalt binder composition can comprise one or more of an additive, e.g., copolymer, rheology modifier, filler, particulate or other re-enforcing material, biocide, pigment, or other materials generally known in the art, and combinations thereof. In any of the aspects or embodiments described herein, the additive or mixture of additives may be included in an amount ranging from about 0% wt to about 70% wt, including all ranges therebetween based on total weight of the asphalt binder composition. In certain embodiments, these materials may independently be included in amounts ranging from about 0% wt to about 50% wt based on the total weight of the asphalt binder composition In certain embodiments, the asphalt binder composition further comprises a copolymer selected from the group consisting of styrene block polymers, styrene, styrene-butadiene copolymers (e.g., SBS, SBR), styrene-isoprene copolymers (SIS), styrene-ethylene/butylene copolymers (SEBS), styrene-ethylene/propylene-styrene copolymers (SEPS) or styrene-isoprene-butylene copolymers (SIBS)

and combinations thereof. Such products are known to the person skilled in the art and are commercially available.

In certain embodiments, the compositions comprise a copolymer, for example, ethylene-vinyl acetate copolymers (EVA). Such copolymers are known to the person skilled in the art. They are polymers with a vinyl acetate content of 10 to 40 mol. % based on the sum of the monomers. They can optionally comprise additional co-monomers. These polymers are usually crystalline or partially crystalline. They have a melting point above 70° C. (measured by DSC). The amount of EVA polymer should be 1 to 30% wt. The ratio EVA:styrene block copolymers should be between 1:50 to 3:1, particularly 1:20 to 1:1. If the amount of EVA is increased then it is possible that the cold adhesion will be negatively influenced.

In any of the embodiments the asphalt binder composition may comprise a filler or the particulate re-enforcing material, e.g., a material such as, clay, calcium carbonate, silica, mineral fines or a combination thereof. As would be appreciated by those of skill in the art, the above are not intended to be limiting on the scope of the invention and any re-enforcing material that is known in the art or that becomes know is intended to be encompassed. In certain embodiments, the clay component can be a non-expansive or an expansive clay. The clay provides a means of suspending the asphalt emulsion and aggregate mixture, as well as other components, in a thixotropic (shear thinning) fluid that prevents rapid separation while still allowing the material to be pumped, sprayed and applied without excessive effort. The clay also plays a role in the dried coating membrane by increasing stiffness and reducing the tendency to track and deform under traffic.

In certain embodiments, the clay filler is present in an amount of from about 3% wt to about 60% wt based on the weight of the asphalt binder composition. In certain embodiments, the clay filler is present in an amount of 20, 25, 30, 35, 40, 45, 50, 55, or 60% wt based on the weight of the asphalt binder composition. In certain embodiments, the clay filler is present in an amount of from about 5% wt to about 25% wt based on the weight of the asphalt binder composition. In certain embodiments, the clay filler is present in an amount of from about 10% wt to about 20% wt based on the weight of the asphalt binder composition. In certain embodiments, the clay filler is present in an amount of about 16% wt based on the weight of the asphalt binder composition.

In certain embodiments, the asphalt binder compositions as described herein can further comprise a biocide or preservative component that prevents or reduces biological growth that may occur within the coating, thus reducing the likelihood of product degradation and odor generation. In certain embodiments, the biocide is present in an amount of from about 0.01% wt to about 0.3% wt based on the weight of the asphalt binder composition. In certain embodiments, the biocide is present in an amount of about 0.01, 0.05, 0.1, 0.15, 0.2, 0.25, 0.3% wt based on the weight of the asphalt binder composition.

In addition, the asphalt composition described herein preferably has unique rheological or viscosity properties such that the aggregate material will remain suspended in the asphalt emulsion from the time that the asphalt composition is manufactured, shipped, and applied to the pavement surface until the composition has set. The asphalt composition desirably is thixotropic in nature enabling it to be applied, e.g., spray applied under a shear.

In certain embodiments, the composition described herein can comprise rheological or viscosity modifiers to provide and/or sustain the thixotropic property of the sealer in storage, transport and application and to thereby prevent separation of the components. In certain embodiments, the asphalt composition comprises from about 0% wt to about 10% wt of a rheology or viscosity modifier, or about 1, 2, 3, 4, 5, 6, 7, 8, 9 or 10% wt of a rheology or viscosity modifier based on the total weight of the asphalt binder composition. In certain embodiments, the rheology modifier is selected from the group consisting of Tegra D, Tegra VM, and combinations thereof.

The unique viscosity behavior of asphalt binder compositions described herein improves aggregate suspension as compared to SS or MS products, resulting in a more uniform distribution of components over the same period of static storage. As a ready mix product it can be sampled without further additives or blend components then tested for certification. The blend's composition has shown to improve ISSA abrasive wear properties when compared to a type I, small aggregate, slurry-seal product. The improved wear properties allow the application to be less than conventional SS treatments for the same wear properties.

In certain embodiments, the pre-blend asphalt binder composition has a viscosity in the range of from about 2000 cp to about 8000 cp. For example, the viscosity of the pre-blend asphalt binder composition is in the range of from about 2000 cp to about 6000 cp, about 2000 to about 4000 cp, about 4000 cp to about 8000 cp, about 4000 cp to about 6000 cp, or about 6000 cp to about 8000 cp. The viscosity can be measured according to any standard procedure known in the art, e.g., helical path viscosity. Many substances, because of the nature of their yield values, may be unsuitable for viscosity or consistency measurements with rotational viscometers. Any rotating spindle, be it cylinder, disc, or paddle, will create a channel in such substances and after a very short time exert a negligible and meaningless torque on any sensing device. This effect also occurs with materials that have a gel structure, and their viscosity is decreased when subjected to internal shearing. While no rotating spindle will ever spin freely in such materials, the torque required to produce this motion will become less as the period of internal shearing lengthens. The study of such data can lead to difficulties and require rigid testing procedures for QC. Other materials, notably pastes and creams, show a combination of the two effects listed above. They will show a yield value as well as a change in relative viscosity/consistency with time.

A Helipath™ Stand (Brookfield) is designed to slowly lower or raise a Brookfield Viscometer/Rheometer so that its rotating T-bar spindle will describe a helical path through the test sample. By always cutting into fresh material, the problem of channeling or separating is eliminated and meaningful viscosity/consistency measurements can be made. The automatic reversing feature of the Helipath™ Stand allows measurements to be made over a variable period of time. The viscosity can also be determined in accordance with ASTM D4402 (Standard Test Method for Viscosity Determination of Unfilled Asphalts Using the Brookfield Thermosel Apparatus).

The flexibility of the binder preferably is determined. If flexibility is determined, flexibility in accordance with ASTM D 3111 (modified) is determined.

In another aspect, the description provides an applied asphalt concrete composition comprising the stable, pre-blended, cold applied asphalt binder composition as described herein, and an aggregate, e.g., a lightweight aggregate. In certain embodiments, the asphalt concrete composition comprises from about 20% wt to about 70% wt of the pre-blended asphalt binder composition as described herein, and from about 45% wt to about 60% wt of aggregate, based on the total weight of the asphalt concrete composition, the difference with water. In certain embodiments, the asphalt concrete composition comprises about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 585, 59, 60, 61, 62, 63, 64, 65, 66, 67, 68, 69, or 70% wt of the pre-blended asphalt binder composition as described herein based on the total weight of the asphalt concrete composition. In certain embodiments, the asphalt concrete composition comprises about 45, 46, 47, 48, 49, 50, 51, 52, 53, 54, 55, 56, 57, 58, 59, or 60% wt of aggregate based on the total weight of the asphalt concrete composition.

Examples of aggregate materials preferred for use include, but are not limited to, expanded calcined slate, calcined shale, crushed boiler slag, crushed trap rock, or a combination thereof, which have relatively low specific gravity, which makes a lightweight final product. As a result, when the lightweight aggregate is mixed with the binder in making the pavement composition, the lightweight aggregate does not rapidly settle and therefore can be mixed easily and applied uniformly.

Typical aggregate size ranges from ¼ inches in diameter to ⅜ inches in diameter; however, smaller or larger aggregate can be employed. Suitable aggregate includes coarse particulate material typically used in construction, such as sand, gravel, crushed stone, slag, recycled concrete or asphalt pavements, ground tire rubber, and geosynthetic aggregates. In paving applications, the aggregate serves as reinforcement to add strength to the overall composite material. Aggregates are also used as base material under roads. In other words, aggregates are used as a stable foundation or road/rail base with predictable, uniform properties (e.g. to help prevent differential settling under the road or building), or as a low-cost extender that binds with more expensive cement or asphalt to form concrete. The American Society for Testing and Materials publishes a listing of specifications for various construction aggregate products, which, by their individual design, are suitable for specific construction purposes. These products include specific types of coarse and fine aggregate designed for such uses as additives to asphalt and concrete mixes, as well as other construction uses. State transportation departments further refine aggregate material specifications in order to tailor aggregate use to the needs and available supply in their particular locations. Sources of aggregates can be grouped into three main categories: those derived from mining of mineral aggregate deposits, including sand, gravel, and stone; those derived from of waste slag from the manufacture of iron and steel; and those derived by recycling of concrete, which is itself chiefly manufactured from mineral aggregates. The largest-volume of recycled material used as construction aggregate is blast furnace and steel furnace slag. Blast furnace slag is either air-cooled (slow cooling in the open) or granulated (formed by quenching molten slag in water to form sand-sized glass-like particles). If the granulated blast furnace slag accesses free lime during hydration, it develops strong hydraulic cementitious properties and can partly substitute for Portland cement in concrete. Steel furnace slag is also air-cooled. Glass aggregate, a mix of colors crushed to a small size, is substituted for many construction and utility projects in place of pea gravel or crushed rock. Aggregates themselves can be recycled as aggregates. Many polymer-based geosynthetic aggregates are also made from recycled materials. Any solid material exhibiting properties similar to those of the above-described aggregates may be employed as aggregate in the processes of various embodiments.

In certain embodiments, the aggregate is a lightweight aggregate. For example, the lightweight aggregate used in the asphalt concrete compositions described herein are lightweight in that they have a specific gravity of no greater than 2.2. In one embodiment, the lightweight aggregate comprises an expanded aggregate. Preferably, the lightweight aggregate used in the composition has a specific gravity between 1.1 and 1.8 and preferably no lower than 0.9. In one embodiment, the lightweight aggregate has a specific gravity that is no greater than 1.4 and which preferably is no greater than about 1.35. Where an expanded aggregate is used, the expanded aggregate preferably has a specific gravity of between 1.1 and 1.5.

The aggregated material will most preferably be fractured expanded calcined slate. The lightweight aggregate can comprise other materials. For example, cinders or the like can also be used as a lightweight aggregate, alone or in combination with other lightweight aggregates.

In certain embodiments, the lightweight aggregate is a lightweight coarse aggregate (expanded aggregate) that has a sieve gradation. In certain embodiments, the lightweight coarse aggregate also has a dry loose weight of between about 39 and about 70 pounds per cubic foot; and preferably about 63 lbs/cubic foot. In certain embodiments, the aggregate has a specific gravity of between about 1.0 and 2.5; and preferably about 1.9. If desired, aggregate having other gradation or gradation ranges can be used.

In addition, it is also preferred that the size of the aggregate material be sufficiently fine that at least about 80-100% by weight of the aggregate material will pass through a number ½ inch US sieve. In certain embodiments, the aggregate material has a fine particle size distribution wherein 10-40% by weight of the aggregate material will pass a number 30 US sieve and only less than 20% by weight will pass a number 200 US sieve. The sized and graded aggregate material used in the composition provides the micro-texture in the finished pavement membrane to increase the measured dynamic friction of the coating. The specific gravity, bulk gravity, size, gradation and geometry play a significant role in providing coating composition that can be applied in a practical manner and generate the desired surface micro-texture properties.

Surprisingly, rather than being a very hard material having a high bulk unit density, we have discovered that the aggregate material effective for improving the surface micro-texture of the inventive coating is an aggregate material which, as mentioned above, has a lower AASHTO T-19 Loose Bulk Density. This aggregate material is able to remain in suspension from the time that the composition is manufactured, shipped, and applied until it has been allowed to set and cure. As a result, a significant proportion of the suspended aggregate material becomes bound at the coating surface.

The micro-texture roughness of an asphalt surface can be measured, for example, using a Dynamic Friction Test (DFT) as set forth in ASTM E 1911. This test provides a measure of surface friction as a function of sliding speed. The DFT apparatus consists of a horizontal spinning disk fitted with a spring-loaded rubber slider that contacts the paved surface as the rotational speed decreases due to the friction generated between the slider and the paved surface. The measured torque generated by the slider force is used to calculate a surface friction value as a function of speed.

In addition, because the amount of aggregate material which can be added to the composition is generally limited by weight, the lower bulk density of the aggregate material used allows a greater volume amount of the aggregate to be included in the composition, thus further increasing both the amount of aggregate material, which can be suspended in the inventive coating composition, and the number of particles, which ultimately become bound at the coating surface.

In another aspect, the disclosure provides a structure, e.g., a pavement or roofing structure, comprising one or more layers of the asphalt as described herein. In certain embodiments, the asphalt compositions as described herein are applied at an amount of greater than 1 lb./sq.yd. In certain embodiments, the asphalt composition as described herein is applied at from about 3 lb/sq.yd to about 80 lb/sq. yd. In certain additional embodiments, the asphalt compositions as described herein are applied at from about 5 lb/sq. yd. to about 15 lb/sq.yd. In still additional embodiments, the asphalt compositions as described herein are applied at from about 5 lb/sq.yd. to about 10 lb./sq.yd.

In the application method of the present disclosure, the inventive coating composition can be applied using a conventional wand sprayer, a conventional sealer spray machine, or other conventional equipment.

The asphalt concrete compositions as described herein are easily stored, shipped, and applied, that is surprisingly and unexpectedly effective for increasing the surface micro-texture roughness of the coating while also providing high durability as defined by WTAT. Moreover, the significant improvement in surface micro-texture provided by the inventive coating is such that, not only does the inventive composition provide superior performance as a sealer for asphalt parking lots, but also, can be used as a maintenance coating on asphalt roads and other asphalt pavement surfaces used for high speed vehicle traffic.

In still another embodiment, the description provides pre-mixed asphalt concrete composition that has enhanced storage stability, but cures and is traffic ready in times comparable to SS and MS. In certain embodiments, the asphalt concrete composition remains storage stable (i.e., approximately homogeneous) for at least 2, 3, 4, 5, 6, 7, 8 days.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages, objects and embodiments are expressly included within the scope of the present disclosure. The publications and other materials used herein to illuminate the background of the invention, and in particular cases, to provide additional details respecting the practice, are incorporated by reference.

The following examples are meant to illustrate, but in no way limit, the claimed invention.

Example 1

TABLE 1

Exemplary Asphalt Formulation.

| % wt Components | | Typical Formula | Comments | Ranges | % Solids |
|---|---|---|---|---|---|
| 42% | | | Asphalt Emulsion Pre-blend | | |
| | Clay Slurry, 38% solids | 40% | inorganic filler - currently using clay suspended in water | +/−2 | 15.2 |
| | Carbon black suspension | 2.0% | Carbon black dispersion | +/−.5 | 0.8 |
| | Tegra D | 0.36% | poly-acrylic acid dispersant, used to control upper viscosity limit | 0-0.5 | 0.216 |
| | Tegra GT | 5.60% | acrylic latex | +/−2 | 2.912 |
| | CSS-1 emulsion | 50.77% | asphalt emulsion | +/−2 | 30.462 |
| | Tegra VM | 1.17% | gum thickener used, if required, to control lower viscosity limit | 0-3 | 0.0117 |
| | Biocide | 0.10% | used to control bacterial growth | na | 0.001 |
| | | | | | 49.6% wt solids |
| | | | | | 50.4% wt water |
| 55% | | Lightweight Aggregate | | | |
| 3% | | Water | | 0-5 | |

Viscosity Range of asphalt binder composition Heliopath rotational viscosity (cp): 2000-8000

FIG. 1 illustrates the wet track abrasion test performance of cold applied asphalt coating (CAAC) compared to examples of Type 1 Slurry Seal (ISSA A105 Design Technical Bulletin). Test method ISSA TB100 was followed for each material except for the sample depth. CAAC material was cast to a depth simulating 6 lbs/SY. Note the CAAC was subjected to 3 day water soak prior to abrasion compared to the type 1 slurry seal materials that were subjected to only 1 hr water soak. The CAAC resistance to water damage and sample loss after abrasion indicates improved performance compared to type 1 slurry seal.

Exemplary Embodiments

In certain aspects, the description provides an asphalt binder composition comprising an asphalt or bitumen emulsion, a filler, and a polymer, wherein the helical viscosity of the composition is from 2000 cp to about 8000 cp.

In any of the aspects or the embodiments described herein, the filler is clay. In any of the aspects or embodiments described herein, the clay is in an amount of from about 10% wt to about 60% wt. In any of the aspects or the embodiments described herein, the clay is present in about 16% wt In any of the aspects or the embodiments described herein, the polymer is an acrylic polymer present in an amount of from 1% wt to about 10% wt. In any of the aspects or the embodiments described herein, the acrylic polymer is present in about 2.8% wt.

In any of the aspects or the embodiments described herein, the asphalt binder composition comprises from about 0.1% wt to about 4% wt of a rheology or viscosity modifier, wherein the viscosity modifier is selected from Tegra D, Tegra VM and a combination thereof.

In any of the aspects or the embodiments described herein, the asphalt binder composition comprises from about 30% wt to about 70% wt of an asphalt emulsion. In any of the aspects or the embodiments described herein, the asphalt binder composition comprises about 51% wt of an asphalt emulsion.

In any of the aspects or the embodiments described herein, the asphalt binder composition comprises a biocide. In any of the aspects or the embodiments described herein, the biocide is in an amount of from 0.01% wt to about 0.3% wt.

In any of the aspects or the embodiments described herein, the asphalt binder composition comprises carbon black. In any of the aspects or eth embodiments described herein, the carbon black is in an amount of from 1% wt to about 5% wt.

In any of the aspects or the embodiments described herein, the asphalt binder composition further comprises aggregate.

The description also provides an asphalt concrete composition comprising from about 20% wt to about 60% wt of an asphalt binder composition as described herein, and from about 45% wt to about 70% wt of aggregate based on the total weight of the asphalt concrete composition, the difference with water.

In any of the aspects or the embodiments described herein, the aggregate is a lightweight aggregate.

In any of the aspects or the embodiments described herein, the asphalt concrete composition comprises about 42% wt of an asphalt binder composition as described herein, and about 55% wt of aggregate, the difference with water.

The description also provides, an asphalt concrete composition comprising:
a. from about 40% wt to about 45% wt of an asphalt binder composition based on the total weight of the asphalt concrete composition including:
  i. from about 45% wt to about 55% wt of an asphalt emulsion based on the total weight of the asphalt binder composition;
  ii. from about 3% wt to about 8% wt of an acrylic polymer based on the total weight of the asphalt binder composition;
  iii. from about 1% wt to about 3% wt of a viscosity modifier based on the total weight of the asphalt binder composition;
  iv. from about 35% wt to about 45% wt of a clay slurry based on the total weight of the asphalt binder composition;
  v. from about 1% wt to about 3% wt of carbon black based on the total weight of the asphalt binder composition;
  vi. from about 0.01% wt to about 1% wt of a biocide based on the total weight of the asphalt binder composition, to 100% wt with water, wherein the asphalt binder composition has helical viscosity of from about 2000 cp to about 8000 cp; and
  vii. from about 50% wt to about 55% wt of a lightweight aggregate based on the total weight of the asphalt concrete composition; and to 100% wt with water.

In any of the aspects or the embodiments described herein, the helical viscosity of the asphalt binder composition is in a range of from about 4000 cp to about 8000 cp.

The description also provides a structure comprising a coating or layer of any of the asphalt compositions as described herein.

The description provides a method of coating a substrate or structure comprising the steps of providing any asphalt concrete composition as described herein, and a substrate, and applying a coating of the asphalt concrete composition. In any of the aspects or embodiments described herein, the asphalt concrete composition is applied by spraying.

The description further provides a method of making an asphalt concrete composition comprising the steps of:
(a) providing asphalt binder composition as described herein;
(b) providing a lightweight aggregate;
(c) admixing the asphalt binder composition from (a) with the aggregate from (b) to form an asphalt concrete composition.

While preferred embodiments of the disclosure have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A stable and sprayable asphalt composition comprising:
   (a) from about 20% wt to about 55% wt of an asphalt binder composition, including:
      (i) from about 3% wt to about 50% wt of a filler;
      (ii) from about 1% wt to about 10% wt of a polymer;
      (iii) from about 0.1% wt to about 4% wt of a rheology or viscosity modifier; and
      (iv) from about 45% wt to about 55% wt of an asphalt emulsion;
   (b) from about 45% wt to about 70% wt of aggregate; and
   (c) the difference with water,
   wherein the viscosity of the composition is from 2000 cp to about 8000 cp.

2. The asphalt binder composition of claim 1, wherein at least one of:
   the filler is clay;
   the polymer is an acrylic polymer; or
   a combination thereof.

3. The asphalt binder composition of claim 2, wherein the clay is in an amount of from about 5% wt to about 25% wt.

4. The asphalt binder composition of claim 1, further comprising a lightweight aggregate.

5. The asphalt binder composition of claim 4, further comprising carbon black in an amount of from 1% wt to about 3% wt.

6. The asphalt binder composition of claim 1, wherein the rheology or viscosity modifier is in an amount of from about 0.1% wt to about 3% wt.

7. The asphalt binder composition of claim 1, further comprising a biocide in an amount of from 0.01% wt to about 0.3% wt.

8. The asphalt composition of claim 1, wherein: the filler is present in an amount of about 5% wt to about 25% wt; and
   the polymer is present in an amount of about 1% wt to about 10% wt.

9. The asphalt composition of claim 1, wherein: the filler is present in an amount of about 5% wt to about 25% wt; and
   the polymer is present in an amount of about 3% wt to about 8% wt.

10. The asphalt composition of claim 9, wherein the polymer is acrylic polymer and the filler is clay.

11. A sprayable asphalt composition comprising from about 20% wt to about 55% wt of an asphalt binder composition, and from about 45% wt to about 70% wt of an aggregate based on the total weight of the sprayable asphalt composition, the difference with water, wherein the asphalt binder composition comprises:
    from about 30% wt to about 60% wt of an asphalt or bitumen emulsion,
    from about 3% wt to about 60% wt of a filler, and
    from about 0.01% wt to about 20% wt of a polymer,
    wherein the viscosity of the composition is from 2000 cp to about 8000 cp.

12. An asphalt concrete composition comprising:
    a. from about 40% wt to about 45% wt of an asphalt binder composition based on the total weight of the asphalt concrete composition, wherein the asphalt binder composition includes:
       i. from about 45% wt to about 55% wt of an asphalt emulsion based on the total weight of the asphalt binder composition;
       ii. from about 3% wt to about 8% wt of an acrylic polymer based on the total weight of the asphalt binder composition;
       iii. from about 1% wt to about 3% wt of a viscosity modifier based on the total weight of the asphalt binder composition;
       iv. from about 5% wt to about 25 wt % of clay based on the total weight of the asphalt binder composition;
       v. from about 1% wt to about 3% wt of carbon black based on the total weight of the asphalt binder composition;
       vi. from about 0.01% wt to about 1% wt of a biocide based on the total weight of the asphalt binder composition, to 100% wt with water, wherein the asphalt binder composition has helical viscosity of from about 2000 cp to about 8000 cp; and
    b. from about 50% wt to about 55% wt of a lightweight aggregate based on the total weight of the asphalt concrete composition; and
    c. to 100% wt with water.

13. A structure comprising a coating or layer of the asphalt composition of claim 12.

14. The asphalt concrete composition of claim 12, wherein:
    the asphalt emulsion is present in an amount of about 45% wt to about 55% wt;
    the filler is present in an amount of about 5% wt to about 25% wt;
    the polymer is present in an amount of about 1% wt to about 10% wt;
    the viscosity modifier is present in an amount of about 1% wt to about 3% wt; and
    the carbon black is present in an amount of about 1% wt to about 3% wt.

15. The asphalt concrete composition of claim 12, wherein:
    the asphalt emulsion is present in an amount of about 45% wt to about 55% wt;
    the filler is present in an amount of about 5% wt to about 25% wt;
    the polymer is present in an amount of about 3% wt to about 8% wt;
    the viscosity modifier is present in an amount of about 1% wt to about 3% wt; and
    the carbon black is present in an amount of about 1% wt to about 3% wt.

* * * * *